United States Patent
Omer et al.

(10) Patent No.: US 12,410,666 B2
(45) Date of Patent: Sep. 9, 2025

(54) METHODS OF USING MULTI-PARTICLE LOST CIRCULATION MATERIAL IN HIGHLY POROUS OR FRACTURED FORMATIONS

(71) Applicant: Weatherford Technology Holdings, LLC., Houston, TX (US)

(72) Inventors: Mohammed Omer, Abu Dhabi (AE); Francisco E. Fragachan, Katy, TX (US); Samuel Strickland, Houston, TX (US)

(73) Assignee: Weatherford Technology Holdings, LLC., Houston, TX (US)

( * ) Notice: Subject to any disclaimer, the term of this patent is extended or adjusted under 35 U.S.C. 154(b) by 0 days.

(21) Appl. No.: 18/489,738

(22) Filed: Oct. 18, 2023

(65) Prior Publication Data
US 2025/0084713 A1    Mar. 13, 2025

Related U.S. Application Data

(60) Provisional application No. 63/582,302, filed on Sep. 13, 2023.

(51) Int. Cl.
*E21B 21/00* (2006.01)
*C09K 8/516* (2006.01)
*E21B 33/138* (2006.01)

(52) U.S. Cl.
CPC ............ *E21B 21/003* (2013.01); *C09K 8/516* (2013.01); *E21B 33/138* (2013.01); *C09K 2208/18* (2013.01)

(58) Field of Classification Search
None
See application file for complete search history.

(56) References Cited

U.S. PATENT DOCUMENTS

| | | | |
|---|---|---|---|
| 4,716,964 A | 1/1988 | Erbstoesser et al. | |
| 5,377,760 A | 1/1995 | Merrill | |
| 6,312,515 B1 | 11/2001 | Barlet-Gouedard et al. | |
| 6,380,138 B1 | 4/2002 | Ischy et al. | |
| 7,726,400 B2 | 6/2010 | Zusatz et al. | |
| 7,799,743 B2 | 9/2010 | Way et al. | |
| 7,923,413 B2 | 4/2011 | Ghassemzadeh | |
| 10,221,649 B2 | 3/2019 | Shahri et al. | |
| 10,240,411 B1* | 3/2019 | Amanullah | C09K 8/035 |
| 11,572,747 B1* | 2/2023 | Al-Qasim | C09K 8/5045 |
| 2006/0096759 A1 | 5/2006 | Reddy et al. | |
| 2012/0285692 A1* | 11/2012 | Potapenko | E21B 33/138 166/308.1 |
| 2014/0038857 A1* | 2/2014 | Miller | C09K 8/035 507/104 |
| 2014/0182369 A1* | 7/2014 | Blue | G01N 33/2823 73/152.27 |
| 2017/0166795 A1* | 6/2017 | Walker | C09K 8/502 |
| 2017/0253788 A1* | 9/2017 | Ivanov | E21B 33/13 |
| 2019/0153290 A1* | 5/2019 | Katou | C09K 8/512 |
| 2019/0186231 A1* | 6/2019 | Meeks | E21B 21/003 |
| 2020/0048528 A1 | 2/2020 | Beuterbaugh et al. | |
| 2021/0189219 A1* | 6/2021 | Alanqari | E21B 33/138 |
| 2022/0127512 A1* | 4/2022 | Amanullah | C04B 38/009 |

FOREIGN PATENT DOCUMENTS

WO    2012155045 A2    11/2012

OTHER PUBLICATIONS

Krause, R. E. 1991. Lost Circulation Material Usage in Coiled Tubing Remedial Cementing at Prudhoe Bay. Paper SPE 22067-MS presented at International Arctic Technology Conference, Anchorage, Alaska, 29-31 May.
Davidson, E., L. Richardson, et al. 2000. Control of Lost Circulation in Fractured Limestone Reservoirs. Paper SPE 62734-MS presented at IADC/SPE Asia Pacific Drilling Technology, Kuala Lumpur, Malaysia, Sep. 11-13, 2000.
El-Hassan, Hassan I., Abbas, Raafat, Jarouj, Haitham, and Trevor Munk. "Using a Novel Fiber Cement System to Control Lost Circulation: Case Histories from the Middle East and the Far East." Paper presented at the SPE/IADC Middle East Drilling Technology Conference and Exhibition, Abu Dhabi, United Arab Emirates, Oct. 2003.
Fang, C. C., and C. Thaemlitz. "OSPAR-Compliant Technologies for Managing Drilling-Fluid Lost-Circulation Events." Paper presented at the SPE/EPA/DOE Exploration and Production Environmental Conference, Galveston, Texas, Mar. 2005.
Lécolier, E., Herzhaft, B., Rousseau, L., Néau, L., Quillien, B., and J. Kieffer. "Development of a Nanocomposite Gel for Lost Circulation Treatment." Paper presented at the SPE European Formation Damage Conference, Sheveningen, The Netherlands, May 2005.
Ivan, C. D., Quintana, J. L., and L. D. Blake. "Aphron-Base Drilling Fluid: Evolving Technologies for Lost Circulation Control." Paper presented at the SPE Annual Technical Conference and Exhibition, New Orleans, Louisiana, Sep. 2001.
Matsui, Hitoshi , Daitoh, Masaki , Yoshimura, Koichi , and Nobuo Morita. "Development of Environmentally Friendly Lost Circulation Materials for Riserless Drilling." Paper presented at the International Conference on Health, Safety and Environment in Oil and Gas Exploration and Production, Perth, Australia, Sep. 2012.
Written Opinion and International search report from corresponding PCT Application No. PCT/US2024/046460 mailed Jan. 7, 2025.

* cited by examiner

*Primary Examiner* — Andrew Sue-Ako
(74) *Attorney, Agent, or Firm* — Vorys, Sater, Seymour and Pease, LLP

(57) ABSTRACT

Methods comprising: injecting into a wellbore in a subterranean formation a multi-particle lost circulation material composition comprising a base fluid and a particle blend comprising substantially cylindrical particles and substantially spherical particles and wherein said particle blend comprises: degradable particles of at least three different sizes and wherein a first-sized particles and a second-sized particles are substantially cylindrical and a third-sized particles are substantially spherical.

20 Claims, No Drawings

METHODS OF USING MULTI-PARTICLE LOST CIRCULATION MATERIAL IN HIGHLY POROUS OR FRACTURED FORMATIONS

FIELD

The present disclosure generally relates to multi-particle Lost Circulation Materials (LCMs) for fracture sealing or to aid in drilling in substantially unconsolidated and substantially permeable subterranean formations.

BACKGROUND

In oil and gas drilling, one of the frequently encountered problems is lost circulation, which is defined as the undesirable loss of drilling fluid into formation voids during drilling, circulation, running casing. Lost circulation can also be problematic during other operations, such as cementing. Lost circulation generally occurs when the pressure exerted against the subterranean formation by a fluid placed therein, such as a drilling fluid, exceeds the subterranean formation breakdown pressure, or where the fluid encounters a portion of the formation having natural openings such fractures or cavities. Lost circulation may result in one or more problems, such as excessive loss of the downhole fluid, non-productive wellbore time, wellbore stability issues, formation damage, stuck pipe, well kick, well blow-out, and even abandonment of the wellbore. Moreover, lost circulation can cause decreased oil and gas production if the loss of fluid into a formation acts to plug the production zone.

Lost circulation is generally observed in four kinds of formations including natural or induced fractured formations, vugular or cavernous formations, highly permeable formations, and unconsolidated formations. What is needed is an LCM that can prevent lost circulation events.

SUMMARY

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In some embodiments, the present disclosure provides methods comprising: injecting into a wellbore in a subterranean formation a multi-particle lost circulation material composition comprising a base fluid and a degradable particle blend comprising substantially cylindrical particles and substantially spherical particles.

In some embodiments, the present disclosure provides methods comprising: drilling at least a portion of a wellbore into a subterranean formation and injecting into said wellbore a multi-particle lost circulation material composition comprising a base fluid, a degradable particle blend comprising substantially cylindrical particles and substantially spherical particles; degradable particles of at least three different sizes; and wherein a first-sized particles and a second-sized particles are substantially cylindrical and a third-sized particles are substantially spherical.

In some embodiments, the present disclosure provides a multi-particle lost circulation material comprising: a particle blend comprising substantially cylindrical particles and substantially spherical particles.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure generally relates to multi-particle LCMs and related drilling methods. More specifically, multi-particle LCMs for drilling in substantially unconsolidated and/or substantially permeable subterranean formations.

As used in this disclosure, the term "substantially" should be read as a descriptive term that seeks to avoid a strict numerical boundary to the specified parameter. That is, the term "substantially" should be read as a modifier to imply "approximate" rather than "perfect." it refers to a term of approximation rather than a term of degree. For example, referring to "substantially unconsolidated" as opposed to "unconsolidated" refers to a formation that may have some coherency and is not completely loose sand.

Lost circulation materials are used in the oil and gas industry to prevent or mitigate the loss of drilling fluids into the formation-known as lost circulation. Drilling fluids, or muds, serve several key purposes in drilling operations such as maintaining well control, cooling and lubricating the drill bit, carrying cuttings to the surface, and forming a barrier to prevent formation fluids from entering the wellbore. However, these drilling fluids can sometimes undesirably leave the wellbore space and enter the nearby subterranean formation through fractures, through cracks and fissures in the rock, or through interstitial spaces. This can cause a variety of problems such as increased drilling costs, non-productive time, stuck pipe, and even well-control incidents. The loss of drilling fluid also creates environmental concerns because the fluid often contains oil-based products and other potentially harmful materials.

Known LCM compositions are limited in their ability to seal or reduce flow of drilling fluids into fractures and voids. Often, known LCMs are limited by what size voids they can effectively plug, with sizes over 5, 7, 10, or 15 mm being particularly difficult to plug.

Embodiments of the present invention show that reducing drilling fluid loss and scaling fractures is greatly improved by bridging (i.e., jamming) and then plugging (i.e., scaling) the fracture. Large particles may be used to bridge the fracture, and then smaller particles may be used to plug the interstitial spaces between the larger particles. The combination of bridging and plugging then creates a plug that is able to withstand the pressure of the drilling fluid. In some embodiments, the bridging particles may be placed into the formation followed by the plugging particles, in other embodiments it may be preferred to place the bridging and plugging particles together. While placing the particles together will result in some excess loss of the plugging particles, it may also provide a faster path to plugging and thus reduced fluid loss overall.

LCM materials suitable for use in embodiments of the present invention may vary widely in size and nature, including particles such as fibrous materials, granular materials, or flakes. In some embodiments, the LCMs may involve more specialized products like expandable materials and may further comprise chemical sealants or consolidators.

The multi-particle LCM includes a particle blend. The particles in the particle blend may be formed in a variety of shapes, such as substantially spherical, substantially cylindrical, substantially flake shaped, and any other shape suitable for use downhole. In some preferred embodiments, the particle blend comprises a combination of particles that are substantially spherical, substantially cylindrical, substantially flake shaped, substantially cone shaped, substantially ovoid shaped, substantially disc shaped, or a combination thereof. As used herein, the term "spherical particles" may be limited to particles that have an aspect ratio of about 1:1. As used herein, the term "cylindrical particles" may be limited to particles that are three-dimensional shapes with two substantially parallel circular bases and a substantially curved surface connecting the bases where the axis of the cylinder is the segment connecting the centers of the two bases. The cylindrical particles may have an aspect ratio about greater than 1:1. As used herein, the term "flakes" or "flaked shaped particles" may be limited to particles that are generally flat and thin. Flakes may have an aspect ratio greater than 1:1. The shape of flakes in this disclosure may be substantially similar to mica flakes. In various embodiments, the shape of each type of particle may be substantially homogenous in shape. Substantially homogenous in shape may mean that the variance in the shape of the particles is low. In various embodiments, the particles may be synthetic. Synthetic methods for making particles may be able to create particles that are substantially homogenous in shape. In various embodiments, the particles are well-rounded, rounded, subrounded, subangular, angular, cuspidal angular, or a combination thereof. Without being bound by theory, particle types that are smoother may pack more closely during jamming, plugging, or both as compared to rougher particles such as cuspidal angular particles. Particle size, shape, and morphology may be determined by electron microscopy, optical microscopy, dynamic light scattering, or small-angle x-ray scattering such as that performed by a Morphologi 4-ID particle characterizer (Malvern Panalystical, United Kingdom) or any other method.

In some preferred embodiments, the multi-particle LCM may comprise a particle blend comprising substantially cylindrical particles and substantially spherical particles. In other embodiments, the substantially cylindrical particles are larger than the substantially spherical particles.

The particles in the particle blend may be formed of any suitable material. In various embodiments, the particles comprise a degradable material. Example materials may include polymers, ceramics, metals, fibers, flakes, the like, and any combination thereof. Polymers may include polyethylenes (PE) such as poly(ethylene oxide), polycarbonates (PC), polypropylene (PP), polyesters, polyvinyl chlorides (PVC), polystyrenes (PS), polyetherimides (PEI), polymethyl methacrylates (PMMA), polyamides such as nylon, silicones, fluoropolymers such as polytetrafluoroethylene, thermoplastic polyurethanes (TPU), polyaryletherketones (PAEK), rubber, acrylonitrile-butadiene-styrene (ABS) triblock polymer, acrylic-styrene-acrylonitrile triblock polymer (ASA), polyether ether ketone (PEEK), polyethylene terephthalate (PET), epoxy resins, poly(ε-caprolactone), poly(hydroxybutyrate), poly(anhydrides), poly(orthoesters), poly(amino acids), polyphosphazenes, polyglycolides, polylactides such as poly(D,L-lactide), cross-linked poly(D,L-lactide), copolymers of glycolide and D,L-lactide, polysaccharides, gums such as guar, celluloses such as carboxymethyl cellulose, hydroxyethyl cellulose, polyanionic cellulose, dextran, cellulose derivatives, polycondensation products, the like, and combinations thereof. Other suitable materials include, ground paper, wood fiber, cane, rice hulls, peanut hulls, tree bark, flax, hemp, animal hair, corn and corn derivatives, starches such as corn starch, potato starch, natural fibers such as cotton fibers, jute fibers, ground nut shells, peat moss, feathers, beet pulp, bagasse, ground nuts shells, ground walnut shells, ground pecan shells, ground almond shells, perlite, calcium carbonate, coke, ground rubber, ground mica, mica, cellophane, cork, vermiculite, bentonite. Examples ceramics and glasses may include crystalline or glassy oxides, nitrides, silicates, carbides, the like, and any combination thereof. In particular, degradable materials include polyesters, poly(ε-caprolactone), poly(hydroxybutyrate), poly(anhydrides), poly(orthoesters), poly(amino acids), polyphosphazenes, polysaccharides such as dextran or cellulose, chitin, chitosan, proteins, orthoesters, aliphatic polyesters, poly(lactide), poly(glycolide), poly(ε-caprolactone), poly(hydroxybutyrate), poly(anhydrides), aliphatic polycarbonates, poly(orthoesters), poly(amino acids), poly(ethyleneoxide), polyphosphazenes, polyglycolides, polylactides such as poly(D,L-lactide), cross-linked poly(D,L-lactide), copolymers of glycolide and D,L-lactide, polysaccharides, polycondensation products, gums such as guar, ground paper, wood fiber, cane, rice hulls, peanut hulls, tree bark, flax, hemp, animal hair, corn and corn derivatives, starches such as corn starch, potato starch, natural fibers such as cotton fibers, jute fibers, ground nut shells, peat moss, feathers, beet pulp, bagasse, ground nuts shells, ground walnut shells, ground pecan shells, ground almond shells, and combinations thereof. In various embodiments, particles may comprise a combination of these materials. In various embodiments, a particle blend may comprise particles of one material or material mixture and another set of particles comprising a different material or material mixture. The particles may be manufactured by extruding, grinding, and optionally compounding with other materials.

Particles comprising degradable materials may degrade in a wellbore to substantially dissipate within about 2 days, about 3 days, about 10 days, about 30 days, about 40 days, about 45 days, or about 50 days. Substantial dissipation may include most of the particles dissolving into solution. The particle degradation rate may increase as the temperature they are exposed to increases. The particles comprising degradable materials may degrade hydrolytically and/or at high temperatures. Particle degradation may occur at from about 150° C. to about 200° C., about at least 150° C., about at least 175° C., or about at least 200° C. As used herein, the term degradable particles may refer to particles that are degradable within these time periods or particles that generally degrade over time. Particles comprising degradable materials may lose 50% of their mass within about 2 days, about 3 days, about 10 days, about 15 days, or about 20 days. This degradation may occur at from about 150° C. to about 200° C., about at least 150° C., about at least 175° C., or about at least 200° C.

Particles comprising degradable materials may degrade in a wellbore to completely dissipate from within about 5 days, about 4 days, about 3 days, or about 2 days. This degradation may occur at from about 200° C. to about 250° C., about at least 200° C., about at least 225° C., or about at least 250° C. The particles of the multi-particle LCM may form at least one barrier in a wellbore. This barrier may be degraded the same way and at the same rate as the degradation of the particles. As used herein, the term barrier may include impermeable barriers or partially permeable barriers. The products of particle/barrier degradation may be water soluble. The particles may be shelf stable for at least one year without significant degradation. The particles may be exposed to water such as rain without significant degradation.

The multi-particle LCM may be used to stop or reduce lost circulation in a section of a subterranean formation or a well that is at a low or normal temperature. The multi-particle LCM may be used in subterranean formations or wells to form at least one barrier that stops or reduces fluid loss where the at least one barrier is formed in a section of the subterranean formation or well where the temperature may range from about 10° C. to about 130° C., about 20° C. to about 130° C., about 20° C. to about 120° C., about 20° C. to about 110° C., about 20° C. to about 100° C., about 20° C. to about 90° C., about 20° C. to about 80° C., about 20° C. to about 70° C. or about 40° C. to about 100° C.

Embodiments of the particle blends discussed herein comprises particles of at least two different sizes. In other embodiments, the particle blend may comprise particles of at least three different sizes, in other embodiments at least four different sizes, in other embodiments at least five different sizes, in other embodiments at least six different sizes, in other embodiments at least seven different sizes, in other embodiments at least eight different sizes, in other embodiments at least nine different sizes, and in other embodiments at least 10 different sizes. Each different sized particles may comprise any of the shapes mentioned above. In various embodiments, a first-sized particles and a second-sized particles are substantially cylindrical and a third-sized particles are substantially spherical.

It is to be understood that a person of ordinary skill in the art can create particles of certain sizes using known methods. Typical methods to accomplish this include mechanical milling, ball milling, roller milling, jet milling, wet milling, cryo-milling, microfluidization, ultrasonication, or other known methods to change the size of existing particulates. In other embodiments the particles may be originally formed in the desired particle size and shape and not need further processing.

The sizes of the particles in the particle blend may range from about 15 mm to about 0.00116 mm (12,780 US mesh). Description of a range in this disclosure include each possible particle size endpoint inside that range. For example from about 1 mm to about 0.06 mm (230 mesh), from about 4.76 mm (4 mesh) to about 0.074 mm (200 mesh), from about 2.38 mm (8 mesh) to about 0.062 mm (250 mesh), from about 0.84 mm (20 mesh) to about 0.105 mm (150 mesh), or from about 0.25 mm (60 mesh) to about 0.149 mm (100 mesh). Where a non-uniform particle type is used in the present invention, such as a flake or cylinder, the sizes above refer to the largest size on the shape—that is the length or width of a flake as opposed to its thickness.

Where the particle blend of the present invention uses two particle sizes, the larger, first-sized particles may be present in the blend at from about 10 wt. % to about 90 wt. % (about 20 wt. % to about 80 wt. %, about 30 wt. % to about 70 wt. %, or about 40 wt % to about 60 wt %, or about 50 wt. %). In such embodiment, the smaller, second-sized particles may be present in the blend at from about 10 wt. % to about 90 wt. % (about 20 wt. % to about 80 wt. %, about 30 wt. % to about 70 wt. %, or about 40 wt % to about 60 wt %, or about 50 wt. %). In some preferred embodiments, the first, larger-sized particles are present at about 30 wt % and the second, smaller-sized particles are present at about 70 wt %.

Unless otherwise noted in this disclosure, the weight percentages for particles in the particle blend are based on the weight of the particle blend.

These embodiments with particle blends with these sized particles at these weight percentages may be used to seal or reduce lost circulation in openings with sizes ranging from about 0.5 mm to about 15 mm, about 1 mm to about 10 mm, about 1 mm to about 5 mm, about 5 mm to about 10 mm, about 1 mm, about 5 mm, or about 10 mm.

A particle blend with these sized particles may effectively reduce lost circulation and bridge and plug openings of these sizes. The size of each type of particle allows them to effectively bridge and plug, whereas other sized particles may not pack well together to perform these functions.

Additionally, having these percentages of these particles in the particle blend may result in having enough particles to jam, enough particles to plug, and create efficient packing to form an object such as a barrier that seals or reduces flow of fluid out of an opening.

Where embodiments with three particle sizes are used, it should be noted that the third particle size may be the same "size" as the first or second but a different shape-such as an ovoid rather than a sphere. In other cases, the third particle may have a different size from the chosen first and second particles. In these embodiments, the third-sized particles may be present in the blend at from about 10 wt. % to about 90 wt. % of the total blend.

In some embodiments, the first-sized particles and the second-sized particles are substantially cylindrical and the third-sized particles are substantially spherical.

In various embodiments, the diameter of the third-sized particles are smaller than the second-sized particles' diameter and smaller than the first-sized particles' diameter.

In various embodiments, the third-sized particles' diameter is at least 80%, at least 90%, at least 95%, from about 80% to about 90%, or about 90% to about 95% smaller than the diameter of the particles closest in diameter. As used herein, the term "particles closest in diameter," refers to the next larger diameter type of particles. In a non-limiting example, if a particle size in the particle blend, such as a second-sized particles, was 7 mesh (2,830 microns) and the third-sized particles were 100 mesh (149 microns), then the third-sized particles would be about 95% to about 96% smaller than the next sized particles, which here is the 7 mesh particles. In various embodiments, the diameter of the smallest-sized particles of the particle blend are at least 80%, at least 90%, at least 95%, from about 80% to about 90%, or about 90% to about 95% smaller than the diameter of the largest-sized particles in the particle blend. In various embodiments, the ratio between two different sized particles in the particle blend excludes particles below the 3rd percentile, below the 5th percentile, above the 95th percentile, or above the 97th percentile of particle in the particle blend. These percentiles may be determined by creating a particle size distribution graph of the particle blend. For reference, common particle sized distribution percentiles are called $d_{10}$, $d_{50}$, and $d_{90}$. As used in this disclosure, the percentile is the point on the distribution curve below or above which a certain percentage of particles fall.

In various embodiments, the particle blend comprises at least a first- and second-sized particles, at least a first-, second-, and third-sized particles, at least a first-, second-, third-, and fourth-sized particles, or at least a first-, second-, third-, fourth-, and fifth-sized particles. Various embodiments will have a different number of certain sized particles. Each of these particles may have the size range described above (i.e. about 15 mm to about 0.00116 mm).

These embodiments with particle blends with these sized particles at these weight percentages may be used to seal or reduce lost circulation in openings with sizes ranging from about 5 mm to about 0.25 mm, about 3 mm to about 2 mm, about 2 mm to about 1 mm, about 1 mm to about 0.5 mm, or about 0.5 mm to about 0.25 mm.

The multi-particle LCM may be combined with a base fluid to create a multi-particle LCM composition, which may be used as a drilling fluid. The base fluid may be an oleaginous or aqueous-based.

The oleaginous fluid is not particularly limited, and may be any suitable fluid such as oil or a solution containing both oil and one or more organic or inorganic compounds dissolved in the oil or miscible therewith. The oleaginous fluid may include oils derived from petroleum, such as linear or branched olefins, mineral oils, polyolefins, fatty acid esters, alkanes, paraffins, straight chain, branched, or cyclical alky ethers of fatty acids, other petroleum-derived oils, or combinations thereof. The oleaginous fluid may contain esters, ethers, dialkylcarbonates, hydrocarbons, or combinations thereof. The oleaginous fluid may also include other oils, such as poly diorganosiloxanes, siloxanes, other silicone-based oils, or combinations thereof.

The aqueous-based fluid is not particularly limited, and may be any suitable fluid such as water or a solution containing both water and one or more organic or inorganic compounds dissolved in the water or otherwise miscible therein. For example, the aqueous fluid may contain brine, including natural and synthetic brine. The aqueous fluid may include water containing water-soluble organic compounds, such as alcohols, organic acids, amines, aldehydes, esters, ketones, other polar organic compounds, or salts dissolved in the water. In various embodiments, the aqueous fluid may include salts, water-soluble organic compounds, or both. Examples of salts that may be present in the aqueous fluid may include metal salts such as calcium salts, lithium salts, sodium salts, cesium salts, zinc salts, aluminum salts, magnesium salts, potassium salts, silicates, the like, and any combination thereof.

A multi-particle LCM composition may be injected into a wellbore of a subterranean formation to prevent, repair, or reduce lost circulation. The creation of a multi-particle LCM composition is not particularly limited, and may be formed by mixing a base fluid, which may be drilling fluid, the multi-particle LCM, and optionally any other additives.

The multi-particle LCM may be included in drilling fluid and may be used while drilling. Drilling fluid may include a base fluid and other additives. The multi-particle LCM composition may be used as a pill separate from the normal drilling fluid. When lost circulation is detected, the multi-particle LCM composition, drilling fluid, additives, or a combination thereof may be injected into the wellbore. The multi-particle LCM composition may be injected to a certain depth or distance into a wellbore by blocking a section of the wellbore after the targeted wellbore depth. The multi-particle LCM composition may be pumped at any hydrostatic pressure. The multi-particle LCM composition may be pumped at a pressure sufficiently high to squeeze the multi-particle LCM composition into certain parts of the formation. This may be known as squeezing. The multi-particle LCM composition may be injected into a wellbore that has been at least partially cemented.

A method for using the multi-particle LCM composition includes drilling at least a portion of a wellbore into a subterranean formation and injecting into the wellbore the multi-particle LCM composition. The multi-particle LCM composition may be advantageously used for drilling in certain subterranean formations to prevent lost circulation events from occurring or to repair lost circulation events. Lost circulation events include events where at least some fluid escapes the wellbore into the subterranean formation. The extent to which fluid is lost during drills operations may be categorized into volumetric loss rates such as seepage (less than 1.6 $m^3$/h), partial (from about 1.6 $m^3$/h to about 16 $m^3$/h), severe (more than 16 $m^3$/h), and total (no fluid return to the surface). The multi-particle LCM composition may be used to seal or reduce the lost fluid flow from a wellbore.

The multi-particle LCM composition may be used in substantially permeable or substantially fractured formations. Permeable formations may include formations with a permeability of greater than about 20 millidarcies or greater than about 1 darcy. Substantially permeable formations include substantially unconsolidated, substantially loosely consolidated, and substantially carbonate formations. Unconsolidated formations may be formations that are loosely packed with little or no bonding among the particles or pebbles. In unconsolidated formations, if the drill string is removed from the formation, the formation may collapse at least partway into the wellbore. Unconsolidated formations may include sand formations, sandstone formations, gravel formations, or combinations thereof. Carbonate formations may include limestone formations, formations that consist essentially of carbonate minerals, formations that comprise about at least 50% carbonate mineral, about at least 60% carbonate mineral, about at least 70% carbonate mineral, about at least 80% carbonate mineral, about at least 90% carbonate mineral, or oil and/or gas reservoirs in the Middle East such as the Ghawar Field and the Zagros Basin reservoirs. Various embodiments of the multi-particle LCM composition may be used in formations that are naturally or synthetically fractured. The multi-particle LCM composition may be used in fractured formations with a linear fracture density from about 0.5 per meter to about 3.75 per meter, 1 per meter to about 2.5 per meter, or about 1.5 per meter to about 2 per meter, at least 0.5 per meter, at least 1 per meter, at least 1.25 per meter, at least 1.5 per meter, at least 1.75 per meter, at least 2 per meter, at least 2.25 per meter, at least 2.5 per meter, at least 2.75 per meter, at least 3 per meter, at least 3.25 per meter, at least 3.5 per meter, or at least 3.75 per meter where the linear fracture density is measured along the line parallel to the wellbore. Various embodiments of the multi-particle LCM composition may be used in high temperature subterranean formations such as formations exceeding about 150° C., about 175° C., about 200° C., about 225° C., about 250° C., or about 260° C. The subterranean formation may only have a portion of it at this temperature. The multi-particle LCM of this disclosure may be formulated so as to function or at least partially function while being exposed to these temperatures.

The multi-particle LCM composition may be advantageously injected into a wellbore to temporarily or permanently seal fractures, vugs, or substantially permeable zones. A vug may be a cavity, void, or large pore in a rock that may be lined with mineral precipitate. The multi-particle LCM composition may form a barrier or a partially permeable barrier over openings causing lost circulation of fluids or cement loss. In various embodiments, this barrier may be degraded by temperature, chemicals, biological activity, or mechanical activity. In various embodiments, the barrier may be degraded after sealing is no longer needed.

Further Embodiments

Embodiments disclosed herein include the following:

A. A method comprising: injecting into a wellbore in a subterranean formation a multi-particle lost circulation material composition comprising a base fluid and a degradable particle blend comprising substantially cylindrical particles and substantially spherical particles.

B. A method comprising: drilling at least a portion of a wellbore into a subterranean formation and injecting into said wellbore a multi-particle lost circulation material composition comprising a base fluid a degradable particle blend comprising substantially cylindrical particles and substantially spherical particles; degradable particles of at least three different sizes; and wherein a first-sized particles and a second-sized particles are substantially cylindrical and a third-sized particles are substantially spherical.

C. A multi-particle lost circulation material comprising: a particle blend comprising substantially cylindrical particles and substantially spherical particles.

Each of embodiments A, B, and C may include one or more of the following elements in any combination.

Element 1: wherein said particle blend comprises: degradable particles of at least three different sizes and wherein a first-sized particles and a second-sized particles are substantially cylindrical and a third-sized particles are substantially spherical.

Element 2: wherein said third-sized particles' diameter is at least about 95% smaller than said diameter of said largest-sized particles in said particle blend, wherein determining said sizes of said particles excludes particles in said particle blend above said 97th percentile and below said 3rd percentile in particle size as measured by said particle size distribution of said particle blend.

Element 3: wherein said wellbore comprises at least one opening that at its largest width is from about 4.5 mm to about 5.5 mm, about 6.5 mm to about 7.5 mm, about 9.5 mm to about 10.5 mm, or about 14.5 mm to about 15.5 mm.

Element 4: wherein said openings are natural fractures or vugs.

Element 5: wherein a section of said subterranean formation to be drilled into comprises at least one portion that is at least about 150° C.

Element 6: wherein a section of said subterranean formation to be drilled into comprises at least one portion that is at least about 250° C.

Element 7: wherein said wellbore has a fluid loss rate of at least about 16 m³/h.

Element 8: wherein said third-sized particles' diameter is at least about 90% smaller than said diameter of said largest-sized particles in said particle blend, wherein determining said sizes of said particles excludes particles in said particle blend above said 95th percentile and below said 5th percentile in particle size as measured by said particle size distribution of said particle blend.

Element 9: wherein said wellbore has a fluid loss rate from about 1.6 m³/h to about 16 m³/h or at least 1.6 m³/h.

Element 10: further comprising said particles forming at least one barrier that stops or reduces fluid loss and subsequently degrading said barrier.

Element 11: wherein said particles have substantially dissipated 2 days after injection.

Element 12: wherein said subterranean formation comprises at least about 80% carbonate minerals, is substantially loosely consolidated, substantially unconsolidated, or has a linear fracture density of at least 1 per meter.

Element 13: wherein said subterranean formation has a permeability of at least about 20 millidarcies.

Element 14: wherein said particle blend comprises degradable particles of at least three different sizes and wherein a first-sized particles and a second-sized particles are substantially cylindrical and a third-sized particles are substantially spherical.

Element 15: wherein said diameter of said third-sized particles are smaller than said second-sized particles' diameter and smaller than said first-sized particles' diameter.

Element 16: wherein said particle blend comprises from about 13 wt. % to about 17 wt. % of said first-sized particles, from about 23 wt. % to about 27 wt. % of said second-sized particles, and from about 58 wt. % to about 62 wt. % of said third-sized particles.

Element 17: wherein said section of said subterranean formation where said at least one barrier forms ranges from about 20° C. to about 65° C.

To facilitate a better understanding of the present disclosure, the following examples of preferred or representative embodiments are given. In no way should the following examples be read to limit, or to define, the scope of the invention.

EXAMPLES

The particle blend as shown in Table A was mixed with 266 mL of tapwater and 1.9 g of xanthan to create a 350 mL solution of the multi-particle LCM composition.

TABLE A

| Particle Size (mesh) | Amount (kg/m³) | Weight % |
|---|---|---|
| 4 | 14 | 15 |
| 7 | 24 | 25 |
| 100 | 57 | 60 |
| Total | 95 | 100 |

A piston was inserted into a high-temperature, high-pressure test cell. An oil-based mud and the multi-particle LCM composition were added to the cell. The cell was assembled with a 5 mm slot disk and a rupture disk. The cell was pressured to 800 psi with 300 psi back press (500 psi net). The cell was heated to 175° C. and then maintained at that temperature for 30 min before testing. Then the filtration valve was opened. The result was successful bridging with no 5 mesh particles in the discharge, less than 1 g of 7 mesh material in the discharge, and all fluid was discharged.

The other multi-particle LCM formulations created are shown in the following tables. The weight percentages are based on the weight of the particle blend. A particle size with A/B, where A and B are different numbers, indicates that the particles range between those particles sizes. As indicated in the tables, some formulations were tested to determine their ability to seal slots while other formulations were tested against 16/30 blend sand compositions to determine their ability to reduce invasion of fluid into the sand.

TABLE 1

| Slot Size (mm) | 3 | — |
|---|---|---|
| Temperature (° C.) | 150 | — |
| Particle Size (mesh) | Amount (kg/m³) | Weight % |
| 7 | 150 | 60 |
| 20/40 | 50 | 20 |
| 50 | 25 | 10 |
| 200 | 25 | 10 |
| Total | 250 | 100 |
| Spurt (mL) | 15 | — |
| Filtration Rate (mL/min) | 0 | — |
| Loss Without LCM Composition (mL) | 350 | — |

TABLE 1-continued

| | | |
|---|---|---|
| Loss With LCM Composition (mL) | 18 | — |
| Percent Reduction | 96 | — |

TABLE 2

| Slot Size (mm) | 3 | — |
|---|---|---|
| Temperature (° C.) | 150 | — |

| Particle Size (mesh) | Amount (kg/m³) | Weight % |
|---|---|---|
| 7 | 140 | 64 |
| 20/40 | 40 | 18 |
| 50 | 20 | 9 |
| 200 | 20 | 9 |
| Total | 220 | 100 |
| Spurt (mL) | 16 | — |
| Filtration Rate (mL/min) | 0 | — |
| Loss Without LCM Composition (mL) | 350 | — |
| Loss With LCM Composition (mL) | 16 | — |
| Percent Reduction | 95 | — |

TABLE 3

| Slot Size (mm) | 2 | — |
|---|---|---|
| Temperature (° C.) | 150 | — |

| Particle Size (mesh) | Amount (kg/m³) | Weight % |
|---|---|---|
| 7 | 72 | 60 |
| 20/40 | 24 | 20 |
| 50 | 12 | 10 |
| 200 | 12 | 10 |
| Total | 120 | 100 |
| Spurt (mL) | 18 | — |
| Filtration Rate (mL/min) | 0 | — |
| Loss Without LCM Composition (mL) | 350 | — |
| Loss With LCM Composition (mL) | 18 | — |
| Percent Reduction | 94 | — |

TABLE 4

| Slot Size (mm) | 1 | — |
|---|---|---|
| Temperature (° C.) | 150 | — |

| Particle Size (mesh) | Amount (kg/m3) | Weight % |
|---|---|---|
| 14/30 | 50 | 67 |
| 50 | 17.5 | 23 |
| 200 | 7.5 | 10 |
| Total | 75 | 100 |
| Spurt (mL) | 10 | — |
| Filtration Rate (mL/min) | 0 | — |
| Loss Without LCM Composition (mL) | 350 | — |
| Loss With LCM Composition (mL) | 10 | — |
| Percent Reduction | 97 | — |

TABLE 5

| Slot Size (mm) | 0.5 | — |
|---|---|---|
| Temperature (° C.) | 150 | — |

| Particle Size (mesh) | Amount (kg/m³) | Weight % |
|---|---|---|
| 20/40 | 50 | 67 |
| 50 | 17.5 | 23 |
| 200 | 7.5 | 10 |
| Total | 75 | 100 |
| Spurt (mL) | 25 | — |
| Filtration Rate (mL/min) | 0 | — |
| Loss Without LCM Composition (mL) | 350 | — |
| Loss With LCM Composition (mL) | 25 | — |
| Percent Reduction | 93 | — |

TABLE 6

| Slot Size (mm) | 0.25 disk | — |
|---|---|---|
| Temperature (° C.) | 150 | — |
| Particle Size (mesh) | Amount (kg/m³) | Weight % |
| 20/40 | 80 | 80 |
| 140 | 20 | 20 |
| Total | 100 | 100 |
| Spurt (mL) | 20 | — |
| Filtration Rate (mL/min) | 0 | — |
| Loss Without LCM Composition (mL) | 350 | — |
| Loss With LCM Composition (mL) | 20 | — |
| Percent Reduction | 91 | — |

TABLE 7

| Sand (mesh) | 16/30 | — |
|---|---|---|
| Temperature (° C.) | 150 | — |

| Particle Size (mesh) | Amount (kg/m³) | Weight % |
|---|---|---|
| 50 | 75 | 68 |
| 140 | 25 | 23 |
| 200 | 10 | 9 |
| Total | 110 | 100 |
| Filtration Rate (mL/min) | 0 | — |
| Invasion Without LCM Composition (cm) | 14.5 | — |
| Invasion With LCM Composition (cm) | 1.4 | — |
| Percent Reduction | 90 | — |

TABLE 8

| Sand (mesh) | 16/30 | — |
|---|---|---|
| Temperature (° C.) | 150 | — |

| Particle Size (mesh) | Amount (kg/m³) | Weight % |
|---|---|---|
| 20 | 75 | 41 |
| 50 | 75 | 41 |
| 140 | 25 | 14 |
| 200 | 10 | 5 |
| Total | 185 | 100 |
| Filtration Rate (mL/min) | 0 | — |
| Invasion Without LCM Composition (cm) | 14.5 | — |
| Invasion With LCM Composition (cm) | 1.0 | — |
| Percent Reduction | 93 | — |

TABLE 9

| Sand (mesh) | 16/30 | — |
|---|---|---|
| Temperature (° C.) | 150 | — |
| Particle Size (mesh) | Amount (kg/m³) | Weight % |
| 7 (flakes) | 75 | 29 |
| 20 | 75 | 29 |
| 50 | 75 | 29 |
| 140 | 25 | 10 |
| 200 | 10 | 4 |
| Total | 260 | 100 |
| Filtration Rate (mL/min) | 0 | — |
| Invasion Without LCM Composition (cm) | 14.5 | — |
| Invasion With LCM Composition (cm) | 0.9 | — |
| Percent Reduction | 94 | — |

TABLE 10

| Sand (mesh) | 16/30 | — |
|---|---|---|
| Temperature (° C.) | 150 | — |
| Particle Size (mesh) | Amount (kg/m³) | Weight % |
| 4 | 75 | 22 |
| 7 (flakes) | 75 | 22 |
| 20 | 75 | 22 |
| 50 | 75 | 22 |
| 140 | 25 | 7 |
| 200 | 10 | 3 |
| Total | 335 | 100 |
| Filtration Rate (mL/min) | 0 | — |
| Invasion Without LCM Composition (cm) | 14.5 | — |
| Invasion With LCM Composition (cm) | 1.1 | — |
| Percent Reduction | 92 | — |

These formulations show that multi-particle LCM compositions with these sized particles and these percentages are effective for repairing lost circulation and preventing fluid invasion into unconsolidated formations.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b." or, equivalently, "from approximately a to b." or, equivalently, "from approximately a-b") disclosed herein is to be understood to set forth every number and range encompassed within the broader range of values. Also, the terms in the claims have their plain, ordinary meaning unless otherwise explicitly and clearly defined by the applicant. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A method comprising:
    injecting into a wellbore in a subterranean formation a multi-particle lost circulation material composition comprising:
    a base fluid and
    a degradable particle blend comprising substantially cylindrical particles and substantially spherical particles wherein the degradable particles are at least three different sizes and wherein a first-sized particles and a second-sized particles are substantially cylindrical and a third-sized particles are substantially spherical, wherein said first-sized particles are present in the degradable particle blend at about 60 wt. % to about 70 wt. %, by weight of the degradable particle blend, wherein said second-sized particles are present in the degradable particle blend at about 15 wt. % to about 30 wt. %, by weight of the degradable particle blend, and wherein said third-sized particles are present in the degradable particle blend at about 10 wt. % to about 20 wt. %, by weight of the degradable particle blend; and wherein said wellbore comprises at least one opening that causes at least some lost circulation that at its largest width is from about 7 mm to about 15 mm and wherein the degradable particle blend is used to seal or reduce lost circulation in the at least one opening.

2. The method of claim 1, wherein injecting into a wellbore in a subterranean formation a multi-particle lost circulation material is done while (a) drilling at least a portion of a wellbore or (b) fracturing at least a portion of a subterranean formation; and further comprising said particles forming at least one barrier that stops or reduces fluid loss and subsequently degrading said at least one barrier, wherein degrading occurs at a temperature of about 150° C. to about 200° C.

3. The method of claim 1, wherein a third-sized particles' diameter of said third-sized particles is at least about 95% smaller than a diameter of a largest-sized particles in said particle blend, wherein determining said diameters of said particles excludes particles in said particle blend above a 97th percentile and below a 3rd percentile in particle size as measured by a particle size distribution of said particle blend.

4. The method of claim 3, wherein said wellbore wall comprises at least one opening that causes at least some lost circulation that at its largest width is from about 12 mm to about 15 mm and wherein the degradable particle blend is used to seal or reduce lost circulation in the at least one opening.

5. The method of claim 1, wherein a section of said subterranean formation comprises at least one portion that is at least about 150° C. up to about 260° C.

6. The method of claim 1, wherein a section of said subterranean formation comprises at least one portion that is at least about 250° C. up to about 260° C.

7. The method of claim 1, wherein a third-sized particles' diameter of said third-sized particles is at least about 90% smaller than a diameter of a largest-sized particles in said particle blend, wherein determining said diameter of said particles excludes particles in said particle blend above a 95th percentile and below a 5th percentile in particle size as measured by a particle size distribution of said particle blend.

8. The method of claim 1, further comprising said particles forming at least one barrier that stops or reduces fluid loss and subsequently degrading said at least one barrier.

9. The method of claim 8, wherein a section of said subterranean formation where said at least one barrier forms ranges from about 20° C. to about 65° C.

10. The method of claim 9, wherein said particles have substantially dissipated 2 days after injection, wherein substantially dissipated means losing at least 50% of their mass.

11. A method comprising:
drilling at least a portion of a wellbore into a subterranean formation and
injecting into said wellbore a multi-particle lost circulation material composition comprising:
a base fluid;
a degradable particle blend comprising;
substantially cylindrical particles and substantially spherical particles;
degradable particles of at least three different sizes; and
wherein a first-sized particles and a second-sized particles are substantially cylindrical and a third-sized particles are substantially spherical,
wherein said first-sized particles are present in the degradable particle blend at about 60 wt. % to about 70 wt. %, by weight of the degradable particle blend, wherein said second-sized particles are present in the degradable particle blend at about 15 wt. % to about 30 wt. %, by weight of the degradable particle blend, and wherein said third-sized particles are present in the degradable particle blend at about 10 wt. % to about 20 wt. %, by weight of the degradable particle blend; and
wherein said wellbore comprises at least one opening that causes at least some lost circulation that at its largest width is from about 7 mm to about 15 mm and wherein the degradable particle blend is used to seal or reduce lost circulation in the at least one opening.

12. The method of claim 11, wherein said subterranean formation comprises at least about 80% carbonate minerals, is substantially loosely consolidated, substantially unconsolidated, or has a linear fracture density of at least 1 per meter.

13. The method of claim 11, wherein said subterranean formation has a permeability of at least about 20 millidarcies.

14. The method of claim 11, wherein a third-sized particles' diameter of said third-sized particles is at least about 95% smaller than a diameter of a largest-sized particles in said particle blend, wherein determining said diameter of said particles excludes particles in said particle blend above a 97th percentile and below a 3rd percentile in particle size as measured by a particle size distribution of said particle blend.

15. The method of claim 14, wherein said wellbore wall comprises at least one opening that causes at least some lost circulation that at its largest width is from about 12 mm to about 15 mm and wherein the degradable particle blend is used to seal or reduce lost circulation in the at least one opening.

16. The method of claim 11, wherein a section of said subterranean formation comprises at least one portion that is at least about 150° C. up to about 260° C.

17. The method of claim 11, wherein said wellbore has a fluid loss rate of at least about 16 m$^3$/h.

18. The method of claim 11, further comprising said particles forming at least one barrier that stops or reduces fluid loss and subsequently degrading said at least one barrier.

19. The method of claim 18, wherein a section of said subterranean formation where said at least one barrier forms ranges from about 20° C. to about 65° C. and wherein said particles have substantially dissipated 2 days after injection wherein substantially dissipated means losing at least 50% of their mass.

20. The method of claim 1, wherein all the particles of the degradable particle blend degrade at a temperature of about 150° C. to about 200° C.

* * * * *